Oct. 14, 1969     G. F. STOCKDALE     3,472,640
GLASS SEAL MANUFACTURE
Filed Sept. 8, 1966     4 Sheets-Sheet 1
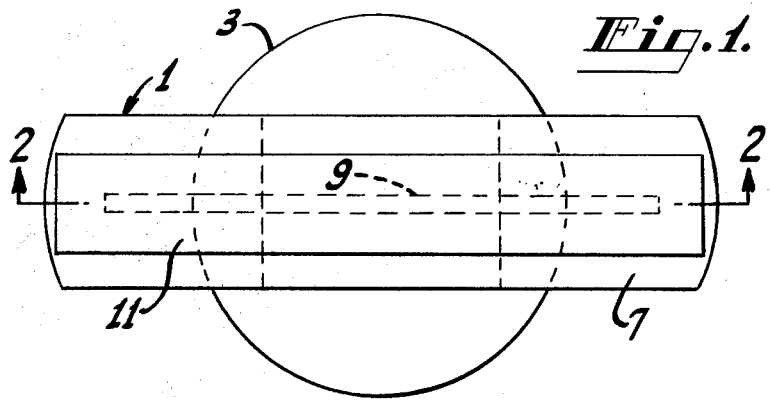
Fig. 1.
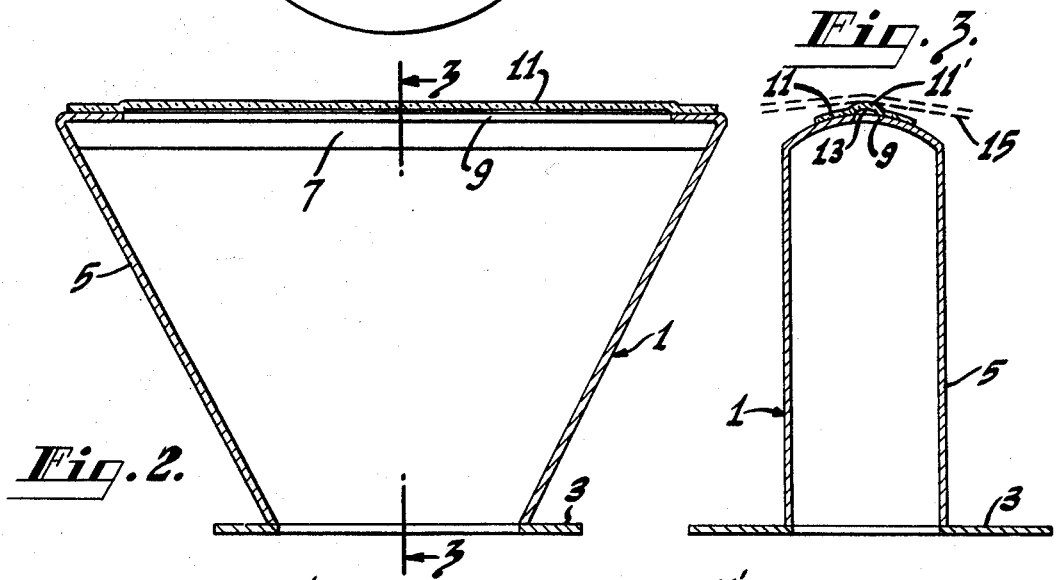
Fig. 2.
Fig. 3.
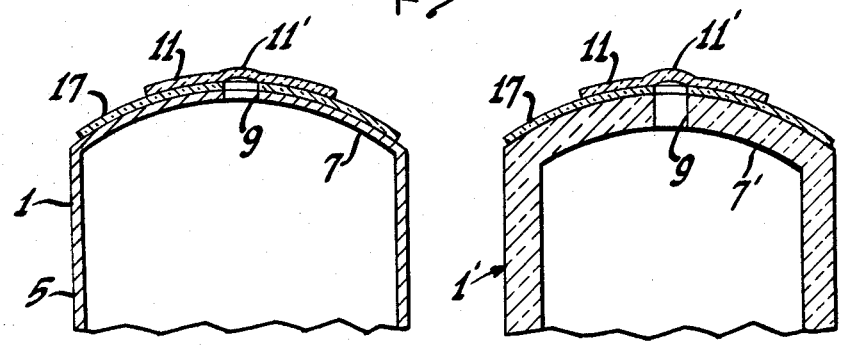
Fig. 4.     Fig. 5.
Inventor:
GEORGE F. STOCKDALE
By   J. R. Webb
          Agent Oct. 14, 1969 G. F. STOCKDALE 3,472,640
GLASS SEAL MANUFACTURE
Filed Sept. 8, 1966 4 Sheets-Sheet 3

Inventor:
GEORGE F. STOCKDALE
By J. R. Webb
Agent

Oct. 14, 1969         G. F. STOCKDALE          3,472,640
                     GLASS SEAL MANUFACTURE
Filed Sept. 8, 1966                        4 Sheets-Sheet 4

Inventor:
GEORGE F. STOCKDALE

By  J. R. Webb
                Agent

United States Patent Office 3,472,640
Patented Oct. 14, 1969

3,472,640
GLASS SEAL MANUFACTURE
George F. Stockdale, Trenton, N.J., assignor to RCA Corporation, a corporation of Delaware
Filed Sept. 8, 1966, Ser. No. 577,864
Int. Cl. C03c 27/02
U.S. Cl. 65—43                                                  12 Claims

ABSTRACT OF THE DISCLOSURE

A method of sealing a narrow thin glass window to a curved slotted cathode ray tube faceplate by locally heating only a narrow elongated region of the window at a time, and by slowly moving the heated region along the length of the window to progressively effect sealing. A thin strip or tape of solder glass frit can be initially fused to the faceplate by the same method.

---

The present invention relates to the manufacture of glass-to-metal and glass-to-glass seals, and particularly to a new and improved method of sealing a glass window to the periphery of a slot in the envelope of a cathode ray tube to be used for contact printing.

A contact printing cathode ray tube usually comprises a metal or glass envelope including an enlarged end portion or faceplate on which a narrow, elongated, aluminized phosphor screen is formed, an opposite end portion containing an electron gun for projecting an electron beam toward the screen, and means for scanning and modulating the beam over the surface of the screen in accordance with an input signal. In the case of an opaque metal envelope, a long narrow slot is formed in the faceplate of the envelope, a transparent thin window, e.g. of glass or mica, is sealed to the envelope over the slot, and the inner portion of the window over the slot is coated with phosphor and aluminized to form the screen. In the case of a glass envelope, although the envelope is transparent, the envelope cannot be made with a single thickness which is great enough to withstand atmospheric pressure and also thin enough to prevent excessive parallax through the screen portion. Thus, the faceplate of the glass envelope is also formed with a long narrow slot to which a thin glass or mica window is sealed and screened. In operation of the tube, a photosensitive medium may be moved over the face of the tube and the phosphor screen of the tube excited to thereby photographically record the desired information on the photosensitive medium.

In the past, windows have been sealed to metal or glass envelopes by sandwiching a layer of low-softening-point glass frit between the window and the envelope and firing the assembly in an oven at a temperature above the softening temperature of the frit. For glass envelopes, the frits selected must be soft enough to fire completely under conditions of temperature and time that will not cause the glass to sag. These conditions severely limit the selection of frits that can be used with many base glasses. Moreover, when a glass seal is made in a cathode ray or other electron tube with common low-softening-point frits, it is not possible to bake out the tube during subsequent processing at a temperature above the softening temperature of the frit without damaging the seal.

An object of the present invention is to provide a new and improved method of making glass-to-glass seals using frits that require firing at temperatures substantially above the sagging temperature of the base glass.

Another object is to provide a new and improved method of producing glass coatings on metal articles.

A further object is to provide a new and improved method of sagging a flat glass sheet onto a curved article of metal or glass.

A further object is to provide a new and improved method of sealing a glass window to the slotted faceplate of a cathode ray tube.

In one practice of the improved method, a layer or coating of glass or glass frit on a glass or metal base may be fired by positioning an elongated narrow radiant heat source of limited area, such as a small diameter rod or wire, in proximity to one edge of the layer, heating the source by passing an electrical current therethrough to a temperature such that the temperature of the glass layer is above the softening temperature of the glass, and slowly moving the source parallel to and across the glass layer. The glass layer fuses along a line or narrow region under the elongated narrow heat source, which line travels with the source across the area to be fired. Since only a small region or portion of the glass is heated at a time, relatively high temperature can be used without producing excessive flow or sag of the glass layer, or of the base if made of glass.

In another practice of the improved method, a glass window may be sealed to a slotted faceplate of a cathode ray tube by applying a layer of glass frit to the area of the faceplate around the slot, firing the frit layer, as by means of a slowly moving heat source as described above, positioning a sheet of glass over the fired frit area and the slot, heating the assembly in an oven to a temperature approximating the annealing point of the glass sheet, sagging and sealing the glass sheet onto the fired frit area by means of a slowly moving heat source as described above, and then cooling to room temperature. In the examples described, the faceplate is curved convex outwardly and a flat sheet of glass is sagged onto the curved faceplate.

In the accompanying drawing,

FIG. 1 is an end view of the funnel portion of a cathode ray tube made according to the present invention;

FIG. 2 is a longitudinal section view taken on the line 2—2 of FIG. 1;

FIG. 3 is a transverse section views taken on the line 3—3 of FIG. 2;

FIGS. 4 and 5 are enlarged fragmentary views, similar to FIG. 3, of modifications thereof;

Figure 6:
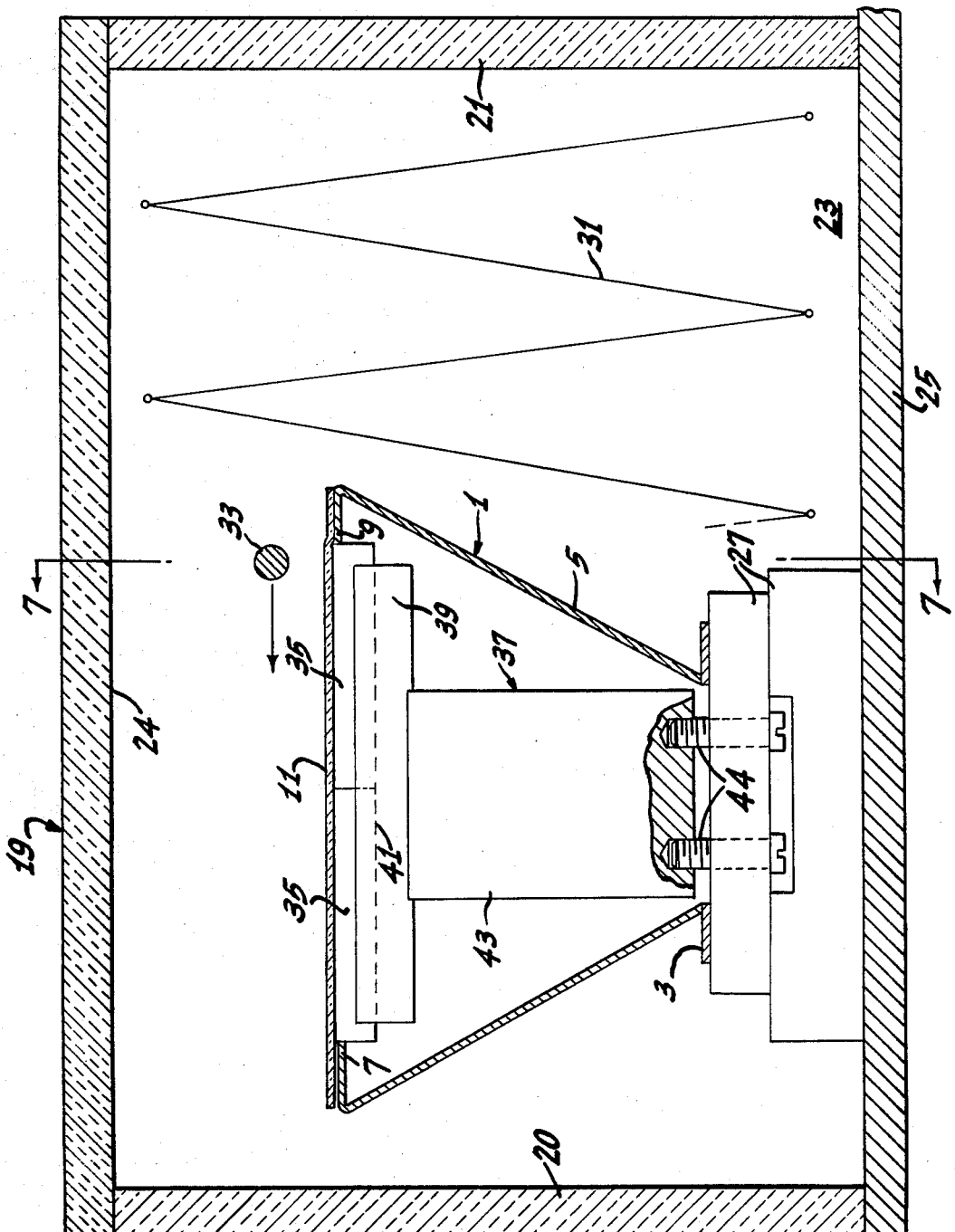
FIG. 6 is a longitudinal section view of an apparatus for sealing a glass window to the faceplate of a cathode ray tube in accordance with the invention.

Referring to the drawing in detail, FIGS. 1–3 show a metal funnel portion 1 of a cathode ray tube suitable for use in contact printing apparatus. This funnel portion 1 comprises a flange 3 for connection to the gun portion (not shown) of the tube, an outwardly flared portion 5, and an elongated rectangular faceplate 7. The faceplate 7, which is preferably curved outwardly as shown in FIG. 3, is formed with a narrow elongated slot 9. The slot 9 is closed by a thin transparent glass window 11 which is sealed to the faceplate 7 around the slot by a novel method to be described later. Subsequent to the sealing of the window to the faceplate, the portion of the inner face of the window exposed through the slot is coated with phosphor and aluminized to form an elongated fluorescent viewing screen 13 for excitation by an electron beam in operation of the tube. As used in contact printing apparatus, letters or characters imaged on the screen 13 excite a sensitive film or tape 15 adjacent to the window 11, as shown by the dashed lines in FIG. 3. For this purpose, the central portion 11' of the window 11 is preferably curved outwardly or convex as shown.

The thin glass window 11 may be sealed directly to the metal faceplate 7 as shown in FIG. 3. However, best results are obtained by providing an intermediate vitreous layer 17 of a glass frit having softening and annealing points (temperatures) somewhat lower than the glass of the window 11, as shown in FIG. 4. In any case, the faceplate 7, window 11 and frit layer 17 (if used) should be compatible, that is, have matching coefficients of thermal expansion. For example, if the faceplate 7 is made of Kovar, which has a thermal coefficient of 45.4 to $50.8 \times 10^{-7}/°$ C. (30–400° C.), the window 11 may be of Kimble glass EN–1, which has a softening point of about 71° C., an annealing point of about 480° C. and a thermal coefficient of about $47 \times 10^{-7}/°$ C. (0–300° C.), and the glass frit may be of Kimble SG–7 Vitreous Solder Glass, which has a softening point of about 572° C., an annealing point of about 476° C. and a thermal coefficient of about $46 \times 10^{-7}/°$ (0–300° C.). Both of these glass compositions are compatible with Kovar.

FIG. 5 shows an alternative to FIG. 4 wherein the funnel portion 1' is made of relatively thick glass, such as Kimble EN–1, and the thin window 11 and frit layer 17 are sealed to the glass faceplate 7', by the method of the present invention.

As an example, the method of sealing the window 11 to the envelope faceplate 7 of FIG. 4 will be explained in detail in connection with FIGS. 6 and 7, with the understanding that the invention is not limited to all of the specific details described.

First, the outer face of a Kovar faceplate 7 is prepared by cleaning in a vapor degreaser and hot deionized water, drying, firing in wet hydrogen at about 1050° C. for about 30 minutes to anneal and de-carburize the surface, and oxidizing by a flame. Then, the adhesive side of a Vitta G–1005 glass transfer tape 17, made of Kimble SG–7 solder glass plus organic binders, is pressed against the outer face of the faceplate 7 over the slot 9 (see FIG. 4). The clear plastic backing is removed from the tape 17 and the tape is trimmed from the slot 9 with a razor blade.

Figure 7:
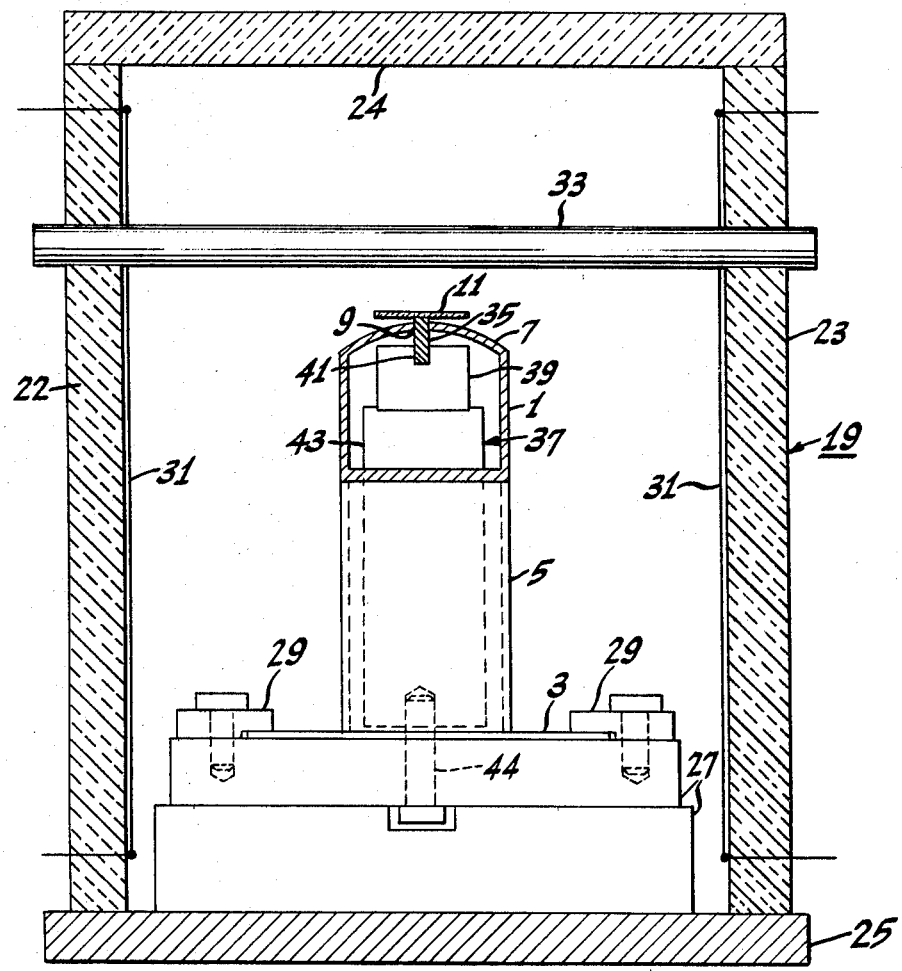
FIG. 7 is a transverse section view taken on the line 7—7 of FIG 6.

Next, the envelope 1 (with the frit layer 17 on the faceplate 7) is mounted within the combined oven and radiant heating apparatus shown in FIGS. 6 and 7. This apparatus comprises a box-like housing 19, made up of four side walls 20–23 and a top wall 24 of firebricks, mounted for sliding movement on the bed of a lathe schematically shown by the base plate 25. The envelope 1 is fixedly mounted on the base plate 25 by one or more blocks 27 and clamps 29 which engage the flange 3. An electric heating coil 31 is mounted along the inner wall of each of the two long sides 22 and 23 of housing 19 to heat the interior thereof, as an oven. In addition to the coils 31, a 5/16" diameter resistive rod 33 of silicon carbide, for example, extends through holes in the walls 22 and 23 and across the housing 19 at a distance of about 3/8" from the slot 9 of the envelope, for locally heating only a narrow region of the frit layer 17 and window 11 at one time by radiant heating.

The glass frit layer 17 on the faceplate 7 is fired or glazed in the housing 19 by first heating the coils 31 to produce an oven temperature sufficient to remove the organic binders from the frit layer 17, e.g. 480° C., then heating the rod 33, by passing a sufficient current therethrough, to about 1200–1400° C., and slowly moving the rod 33 (by moving the housing 19) from one end of the frit layer 17 to the other at a speed such that the temperature of the frit layer 17, produced by the radiant heat from rod 33, is about 650° C., which is above the softening point of the frit. As the rod 33 moves slowly along the frit layer 17, only a narrow region of the layer is fused beneath the rod at a time, which region moves with the rod along the layer 17. Where the envelope is of glass, instead of metal, only a small region of the envelope is softened at one time, and hence, the envelope shape is maintained.

The next step is to seal the window 11 to the fired layer 17. This may be done with the radiant heating rod 33 of FIGS. 6 and 7 without any support for the portion of the window 11 bridging the slot 9. However, in this case the window sags into the slot 9 during the sealing step to produce a concave curvature, instead of the desired convex curvature 11', and it is necessary to convert the concave curvature to the desired convex curvature, to use the tube for contact printing. Therefore, it is preferred to avoid this problem by supporting the window over the slot during the sealing operation. Accordingly, after firing the frit layer 17, as described above, the envelope 1 is removed from the housing 19 and one or more flat support strips 35 of a material such as graphite or boron nitride, which will not stick to hot glass, are adjustably mounted in the slot 9 by means of a jig 37, made up of a bar 39 having a groove 41 in which the strips 35 are positioned, and a block 43 adjustably mounted on the block 27 by screws 44. The strips 35 should fit loosely in the slot 9 and have rounded upper surfaces. The height of the support strips 35 is adjusted so that when the parts are hot the strips project slightly above the sides of the slot 9, to produce the desired curved portion 11' of the window 11. For example, this projection may be about 10 mils for a slot 100 mils wide.

The envelope 1, with the support strips 35 and jig 37 in place, is mounted in the housing 19 and a thin flat rectangular strip 11 of glass is laid on the strips 35, as shown in FIGS. 6 and 7. The strip may be a 5–7 mil thick sheet of Kimble EN–1 glass. The oven is heated slowly to heat the glass strip 11 to its annealing point (480° C.), and then the rod 33 is heated to about 1350° C., at which temperature the adjacent narrow portion of the strip 11 is heated to about 675° C., i.e. slightly below its softening point (710° C.). Starting with the rod 33 at the extreme end of the strip 11 (the right end in FIG. 6) the localized radiant heat from rod 33 softens the strip 11, causing it to sag by gravity onto the curved surface of the faceplate 7 and its fired frit layer 17, and to fuse to the layer 17. The heated rod 33 is moved slowly, at about 1" per minute, along the length of the window strip 11, to sag and seal progressively the entire window 11 to the faceplate 7 around the slot 9. As in firing the frit layer, only a narrow region of the glass is fused beneath the rod 33 at a time, which region moves with the rod. When the seal is completed, the current to the rod 33 is turned off, and the assembly is allowed to cool slowly through the annealing zone to room temperature, to anneal the glass window.

The same method, with the same temperatures, may be used to seal the thin glass window 11 over the slot 9' in the thick walled glass envelope 1' shown in FIG. 5, if Kimble EN–1 glass is used for the envelope. In this case, an additional advantage of the local radiant heating is that the window can be sealed to the envelope without deformation of the envelope even when the same kind of glass is used for the window and the envelope. If the envelope 1' is made of a glass having a higher softening point than the window 11, the oven temperautre should be correspondingly higher.

Figure 8:
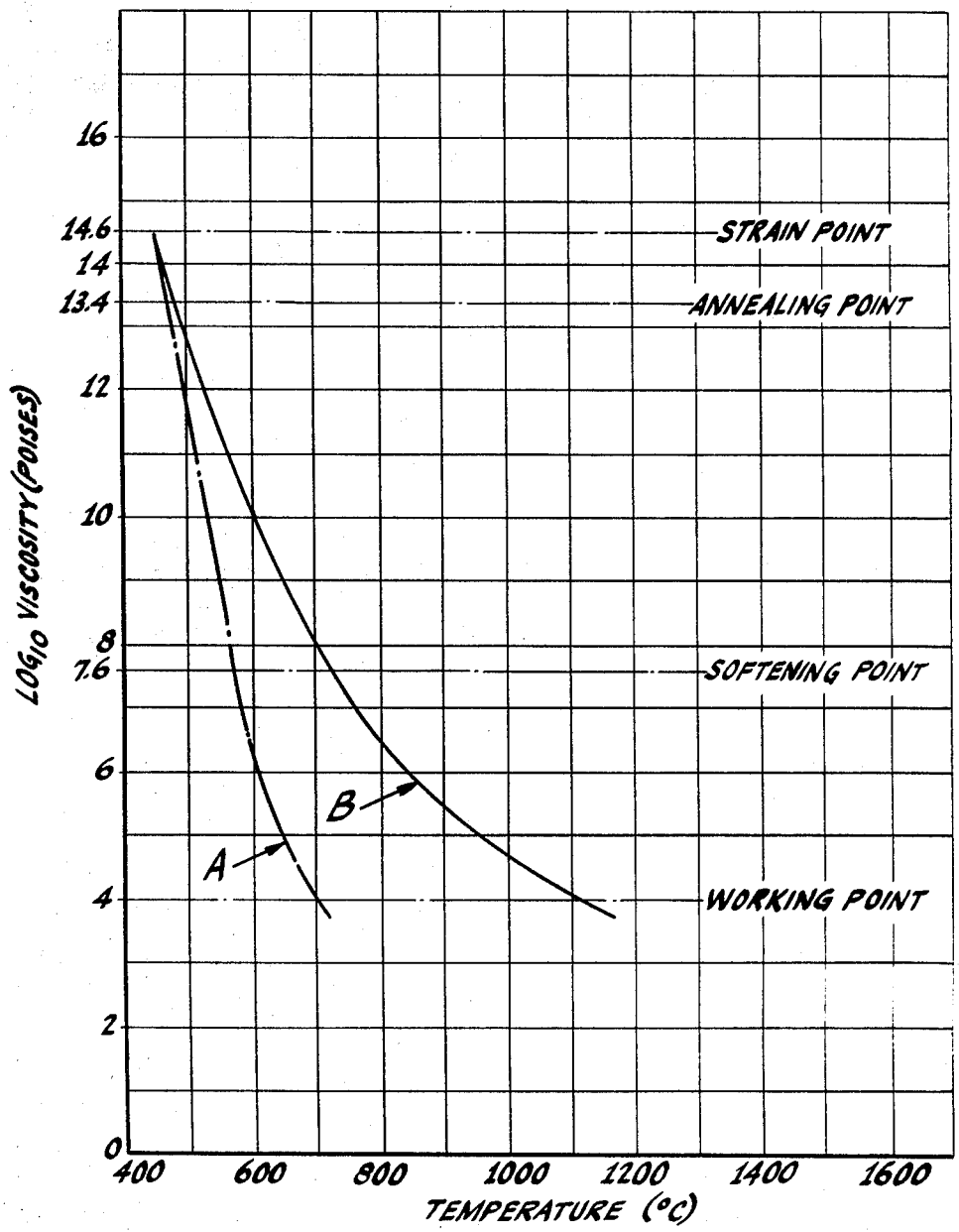
FIG. 8 is a graph of viscosity plotted against temperature for two glass compositions.

FIG. 8 shows the viscosity-temperature curve A for the Kimble SG–7 solder glass frit and curve B for the Kimble EN–1 glass. As shown, these two glasses have substantially the same strain point, at about 456° C., but quite different softening points.

In using the present process for sealing a glass sheet or window directly to a glass or metal envelope (without the intermediate frit layer 17), the outer surface of the faceplate is cleaned and the envelope section 1 or 1', support plates 35 and flat glass window 11 are assembled and placed in the housing 19 of FIGS. 6 and 7. If the envelope is of Kovar (metal), any glass that is compatible with Kovar may be used for the window 11, as for example, Kimble EN-1 glass. If the envelope is of glass, the window 11 may be the same glass as the envelope (if the wall thickness of the envelope is large compared to the window), or a different glass having a lower softening point than the window glass. With either glass or metal for the envelope, the process of progressively sagging the flat glass strip 11 onto the faceplates and sealing the strip 11 around the slot 9 to form the window is similar to that described above for the window-frit seal, except for the temperatures of the radiant heating rod 33 and local region of the glass strip. Without the frit layer, it is necessary to heat the rod 33 to a considerably higher temperature, sufficient to produce a fusing temperature of 1000–1100° C. in the narrow region of the glass beneath the rod, in order to seal the glass to the faceplate 7. In the case of a glass envelope having a softening point substantially lower than this fusing temperature, it may be necessary to cool the opposite (inner) surface of the faceplate 7 to prevent collapse thereof during the sealing operation.

Figures 9, 10:
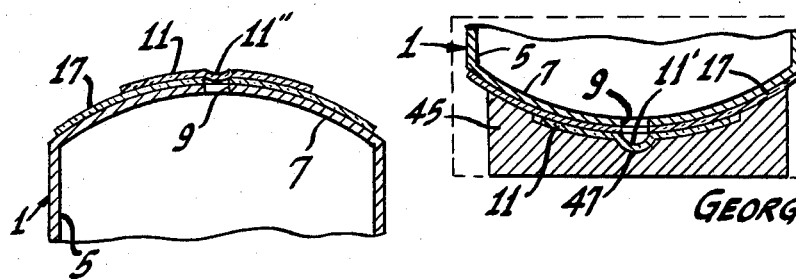
FIG. 9 is a view similar to FIG. 4 of a modification thereof.
FIG. 10 is a sectional view of an apparatus for converting the concave window of FIG. 9 to a convex one.

As stated above, the window 11 can be satisfactorily sealed to the fired layer 17 (or directly to a metal or glass faceplate) with the apparatus of FIGS. 6 and 7 without the support strips 35. However, when the window 11 is not supported, the portion thereof overlying the slot 9 sags into the slot 9 during the sealing operation to produce a concave portion 11″ as shown in FIG. 9. If the tube is to be used as a contact printing tube, it is necessary to convert the concave portion 11″ into the desired convex shape 11′. This may be done as shown in FIG. 10 by placing the funnel portion 1 in an inverted position on a mold block 45 having a concave depression 47 disposed beneath the slot 9 and heating the assembly in an oven, schematically shown at 49, to a temperature near the softening point of the window glass, to sag the concave portion 11″ by gravity into the desired convex shape 11′. Alternatively, the funnel portion 1 may be heated in an oven and the concave portion 11″ converted to a convex shape by air pressure applied to the inner surface thereof, with or without the mold 45.

The method of sealing the glass window to the faceplate wherein the portion of the window overlying the slot is supported during the sealing operation to prevent the window from sagging into the slot, as shown and described in connection with FIGS. 6 and 7 herein, is disclosed and claimed in a joint application of George F. Stockdale and Edmund N. Metz, Ser. No. 577,863 concurrently filed herewith.

What is claimed is:
1. The method of firing a glass layer on a surface of an article, comprisiig the steps of:
 (a) cleaning said surface of said article;
 (b) applying to said cleaned surface a layer of glass to be fired;
 (c) locally heating only a narrow elongated region of said layer at one time by radiant heat to raise the temperature of the glass in said region to a firing temperature above the softening point of said glass; and
 (d) slowly moving said heated region over the entire surface of said layer to progressively fire substantially the entire surface of said layer.

2. The method of claim 1, wherein said narrow region is heated in steps (c) and (d) by a headed rod moveably mounted relative to said article in a plane spaced from and parallel to the exposed surface of said glass layer.

3. The method of claim 1, wherein said article is made of a metal having a melting point higher than said firing temperature.

4. The method of claim 1, wherein said article is made of a glass having a softening point at least equal to the softening point of said glass layer.

5. The method of claim 4, wherein said layer of glass is a thin tape of solder glass frit having a softening point substantially lower than the softening point of said glass article.

6. The method of bonding a glass sheet to a surface of a base member, comprising the steps of:
 (a) cleaning said surface;
 (b) placing said glass sheet over said surface;
 (c) locally heating only a narrow elongated region of said sheet at one time by radiant heat to raise the temperature of said region to a fusing temperature substantially higher than the softening temperature of said sheet, at which temperature the glass in said region of said sheet fuses to said surface; and
 (d) slowly moving said heated region over the surface of said sheet to progressively fuse and bond the sheet to said base member.

7. The method of claim 6, wherein said base member is made of a glass having a softening point substantially equal to that of said glass sheet, and the assembly is heated to the annealing point of the base member prior to step (c).

8. The method of claim 6, wherein said surface of said base member is curved, and a flat sheet of glass is sagged by gravity onto said curved surface in steps (c) and (d).

9. The method of bonding a thin glass sheet to a surface of a base member, comprising the steps of:
 (a) cleaning said surface;
 (b) applying to said cleaned surface a thin layer of glass frit;
 (c) firing said frit layer;
 (d) placing a thin sheet of glass having a softening point substantially higher than the softening point of said glass frit over said fired frit layer;
 (e) locally heating only a narrow elongated region of said sheet at one time by radiant heat to raise the temperature of the glass in said region to a fusing temperature between the softening points of said frit and said sheet, to fuse the glass in said region to said frit layer; and
 (f) slowly moving said heated region over the surface of said sheet to progressively fuse and bond the sheet to said base member.

10. In the manufacture of a cathode ray tube having a faceplate formed with a narrow elongated slot closed by a thin glass window; the method of sealing said window to said faceplate, comprising the steps of:
 (a) cleaning the outer surface of said faceplate surrounding said slot;
 (b) applying to said cleaned surface a layer of glass frit;
 (c) firing said frit layer;
 (d) placing an elongated thin strip of glass having a softening point substantially higher than the softening point of said glass frit over said fired frit layer and said slot;
 (e) locally heating only a transverse narrow elongated region of said strip at one time by radiant heat to raise the temperature of the glass in said region to a fusing temperature between the softening points of said frit and said strip, to fuse the glass in said region to said frit layer; and
 (f) slowly moving said heated region along the length of said strip to progressively fuse and seal the strip to said faceplate and thereby form a thin transparent window over said slot.

11. The method of claim 10, wherein said faceplate is outwardly convex, and a flat strip of glass is sagged by gravity onto said convex faceplate in steps (e) and (f).

12. The method of claim 10, wherein said faceplate is made of a glass having a softening point at least equal to that of said glass strip, and the assembly is heated to the annealing point of the faceplate prior to step (e) and cooled slowly through the annealing range after step (f).

References Cited

UNITED STATES PATENTS

| | | | |
|---|---|---|---|
| 2,598,286 | 5/1952 | Mulder et al. | 65—40 |
| 2,889,952 | 6/1959 | Claypoole | 65—59 XR |

FOREIGN PATENTS 964,709  5/1957  Germany.

S. LEON BASHORE, Primary Examiner
SAUL R. FRIEDMAN, Assistant Examiner

U.S. Cl. X.R.

65—59, 107, 154, 155; 220—2.1, 2.3